United States Patent Office 2,768,982
Patented Oct. 30, 1956

2,768,982

FUSED RING HYDROCARBON PRODUCTION

Maurice J. Schlatter, Kensington, Calif., assignor to California Research Corporation, San Francisco, Calif., a corporation of Delaware No Drawing. Application December 21, 1953,
Serial No. 399,629

4 Claims. (Cl. 260—668)

This invention relates to a novel process for preparing fused ring hydrocarbons. More particularly, the invention is concerned with a novel process for preparing s-hydrindacenes and the useful new products prepared thereby.

Fused ring hydrocarbons are employed in the production of valuable chemicals such as dyes, pharmaceuticals, insecticides and perfume bases. Because of the present day demand for these materials, the development of new methods for their production and also the development of novel compounds of a similar type is important to the synthetic chemicals industry.

I have now found that s-hydrindacenes which are highly useful as chemical intermediates in the preparation of dyes, pharmaceuticals, insecticides, and perfume bases may be prepared by a novel process which comprises contacting an alkyl benzene having two alkyl groups of at least two carbon atoms each in para position and having at least one hydrogen on the α-carbon atom with a tertiary alkylating agent in the presence of an alkylation catalyst under alkylating conditions and recovering the s-hydrindacene formed. New and improved fused ring hydrocarbons of the s-hydrindacene type may also be prepared according to my process.

The overall reaction leading to these interesting s-hydrindacenes and their generalized structure are shown below:

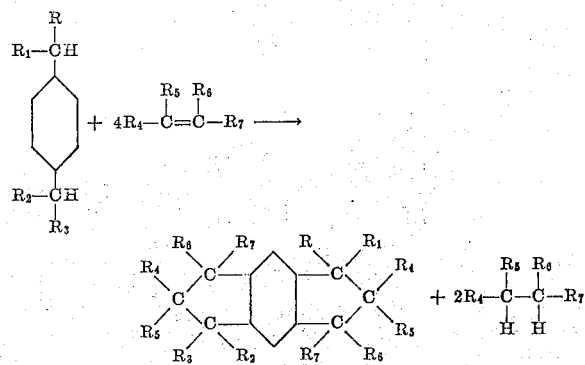

In the above formulae the various R groups may be hydrogen, alkyl or cycloalkyl groups with the exception of R and R₁ and R₂ and R₃. In these cases only one of the two groups attached to the same carbon atom may be hydrogen.

In place of the tertiary olefin represented in the above equation, other alkylating agents, which are well known to the art as ordinarily giving tertiary alkylation products when used in the alkylation of benzene and monoalkylbenzenes, may be substituted.

Variations of the above structures, which are also fused ring hydrocarbons of the s-hydrindacene type, are obtained when one or both of the para substituents of the benzene ring are cycloalkyl or substituted cycloalkyl groups with five or six carbon atoms in the rings and coupled to the benzene ring in such a manner that hydrogen atoms are present on the α-carbon atoms.

As is apparent from their structural formula, the s-hydrindacenes prepared according to the present invention are characterized by an unusual molecular structure combining aromatic and cycloalkyl groups in symmetrical arrangement.

Because of this unique molecular structure, some of the s-hydrindacenes possess uncommonly high melting points and, at the same time, are extraordinarily stable at high temperatures and may be sublimed without decomposition at atmospheric pressure. They can be nitrated to produce nitro compounds useful as perfume bases. Valuable insecticides may also be obtained by chlorinating them. Nitro derivatives of the s-hydindacenes can be reduced to the corresponding amines which may then be oxidized to form the quinones. Both of these types of compounds are of recognized utility in the manufacture of pharmaceuticals and dyes.

The process for preparing s-hydindacenes in accordance with my invention is an unusually practicable one. The reactants required are commonly available. The reaction conditions are not of the extreme type and do not involve the use of expensive equipment. The most desirable feature of the present process, however, lies in the fact that the reaction proceeds in an orderly fashion to give a reaction mixture from which the s-hydrindacenes may be readily separated.

Consistent with the above disclosures, the alkyl benzene of the process may be any para-disubstituted benzene hydrocarbon in which each of the substituents contain at least two carbon atoms. Preferred alkyl benzenes are those in which the substituents are joined to the benzene ring by a secondary carbon atom. The substituents of these compounds have only one hydrogen on the carbon attached to the benzene ring. They may be alkyl or cycloalkyl in structure. Suitable substituents include the ethyl, propyl, butyl, pentyl, isopropyl, cyclopentyl, and cyclohexyl groups, those having only one hydrogen on the carbon attached to the benzene ring being preferred, as already mentioned. For present purposes, para-dialkyl benzenes containing from 2 to 6 carbon atoms in the alkyl groups are preferred because of their ready availability.

Suitable tertiary alkylating agents include isobutene, tertiary butyl chloride, tertiary butyl alcohol, tertiary butyl mercaptan, diisobutylene, tertiary amyl alcohol, 1-methylcyclohexene, 2-methyl-2-pentene and similar types of compounds. Isobutene is preferred because it is readily available and economical to use.

In place of tertiary alkylating agents, compounds which readily rearrange to such structures and which normally behave as tertiary alkylating agents or as tertiary-cycloalkylating agents may be substituted. For example, 4-methylcyclohexene ordinarily gives α-methylcyclohexyl derivatives under alkylating conditions.

In some cases tertiary olefins or tertiary alkylating agents rearrange under the influence of acid catalysts to give other more stable tertiary derivatives or a mixture of tertiary alkylating agents. In these cases, while some rearrangement of the R groups occurs, the basic structures resulting on reaction with the p-dialkylbenzene are still essentially as indicated by the generalized formula shown.

The tertiary alkylation of the para-dialkyl benzene in accordance with the process of the invention is carried out under what is known to the art as alkylating conditions. Under these conditions the necessary hydrogen transfer reaction is readily effected.

P-dicyclohexylbenzene, p-dicyclopentylbenzene, p-cyclopentyl cyclohexylbenzene and alkyl derivatives of these compounds in which the substituents are not located on the benzene ring or on the carbon atoms attached to the benzene ring give fused ring hydrocarbons of the s-hydrindacene type having added fused rings. For example, on reaction with isobutene, p-cyclopentyl cyclohexylbenzene gives the following compound:

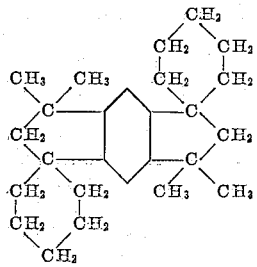

Similarly, tertiary cycloolefins or their derivatives may be used as the t-alkylating agent. P-diisopropylbenzene reacting with 1-methylcyclohexene gives the following compound:

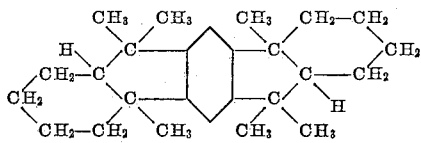

The product resulting from reacting 1-methylcyclohexene with p-dicyclohexylbenzene has the following structure:

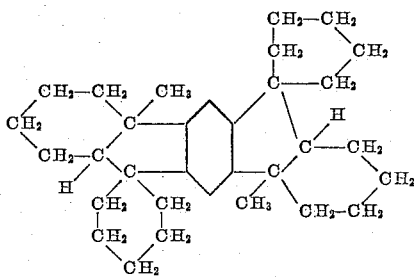

The alkylation catalysts are a well known class of acid-acting catalysts. They include catalysts such as hydrofluoric acid, sulfuric acid, phosphoric acid and Friedel-Crafts catalysts of the aluminum chloride, ferric chloride, and boron trifluoride types. Of these, hydrofluoric acid and sulfuric acid are preferred.

In the reaction, it is preferred that the tertiary alkylating agent be employed in a molar excess over the alkyl benzene. Molar ratios of at least two moles and preferably four moles of tertiary alkylating agent to each mole of alkyl benzene are considered most satisfactory. For practical purposes, from 2 to 5 moles of tertiary butylating agent are employed for each mole of alkyl benzene.

The alkylation reaction is desirably carried out at temperatures in the range of about —30 to about 125° C. and at a pressure from atmospheric up to about 50 atmospheres. When the reaction is carried out in the presence of a hydrofluoric acid catalyst, as presently preferred, temperatures of about 0° C. to about 50° C. are particularly satisfactory.

The s-hydrindacenes may be recovered from the reaction mixture by various methods such as fractional distillation, crystallization, solvent extraction, extractive distillation, etc. A combination of fractional distillation and crystallization is presently preferred.

The following examples are offered in further illustration of the invention:

Example

Isobutene was passed, at a rate of approximately 500 ml. of gas per minute for 144 minutes, into a mechanically stirred mixture of 200 grams of 90 per cent p-diisopropylbenzene and 210 grams of liquid anhydrous hydrogen fluoride contained in a copper flask cooled in an ice bath. The mixture was stirred for an additional hour, the acid phase drawn off and discarded and residual acid neutralized with excess sodium hydroxide solution. Gaseous hydrocarbons trapped in a dry-ice cooled container during these operations were found to be almost entirely isobutane.

The aqueous phase was separated from the hydrocarbon reaction product and the slurry filtered to remove the 1,1,3,3,5,5,7,7-octamethyl-s-hydrindacene as a high melting, comparatively insoluble hydrocarbon. An additional portion was recovered by a combination of vacuum distillation and crystallization, yielding a total of 90.3 grams of solid product melting at 202–212° C. Recrystallization from benzene gave purified 1,1,3,3,5,5,7,7-octamethyl-s-hydrindacene as colorless needles, melting at 220.8–221.2° C.

A carbon and hydrogen analysis of the 1,1,3,3,5,5,7,7-octamethyl-s-hydrindacene gave the following results:

|  | Carbon | Hydrogen |
| --- | --- | --- |
| Calculated for $C_{20}H_{30}$ | 88.82 | 11.18 |
| Found | 88.94–88.86 | 11.02–10.93 |

The molecular weight of the 1,1,3,3,5,5,7,7-octamethyl-s-hydrindacene was determined by boiling point elevation in chloroform as follows:

Calculated _____ 270.44
Found _____ 267

The infrared spectrum was consistent with 1,2,4,5 substitution on the benzene ring. The compound was quite stable and sublimed without decomposition at atmospheric pressure.

Other, novel s-hydrindacenes are also prepared in accordance with the process of the invention as illustrated by the above example.

Para-dicyclohexyl-benzene is contacted with isobutene in the presence of hydrofluoric acid under alkylation conditions to give the interesting molecular structure illustrated by the following formula:

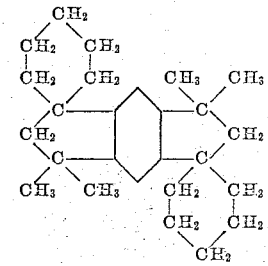

Para-di-sec-butyl-benzene on reaction with isobutene in the presence of hydrofluoric acid under alkylating conditions gives 1,1,3,5,5,7-hexamethyl-3,7-diethyl-s-hydrindacene. This material has the following structural formula:

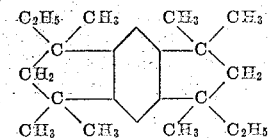

I claim:

1. The process for preparing s-hydrindacenes which comprises effecting a hydrogen transfer reaction in the presence of an acid-acting catalyst between an alkyl benzene having two secondary alkyl groups in para position and at least two moles of a branched-chain olefin for each mole of the alkyl benzene.

2. The process for preparing s-hydrindacenes which comprises effecting a hydrogen transfer reaction in the presence of an acid-acting catalyst at a temperature between about −30° C. to about 125° C. and at a pressure from atmospheric up to about 50 atmospheres between an alkyl benzene having two secondary alkyl groups in para position and at least two moles of a branched-chain olefin for each mole of the alkyl benzene.

3. Process according to claim 2 wherein the acid-acting catalyst is hydrofluoric acid.

4. Process according to claim 3 wherein the dialkyl benzene is para diisopropyl benzene and the branched-chain olefin is isobutene.

References Cited in the file of this patent

UNITED STATES PATENTS 2,514,546    Ipatieff et al. _____ July 11, 1950